(12) United States Patent
Kim et al.

(10) Patent No.: US 7,068,839 B2
(45) Date of Patent: Jun. 27, 2006

(54) METHOD FOR TRANSFORMATING COLOR IMAGE ON IMAGE PROCESSING SYSTEM

(75) Inventors: Whoi-Yul Kim, Seoul (KR); Min-Seok Choi, Seoul (KR)

(73) Assignees: Konan Technology, Inc., Seoul (KR); Whol-Yul Kim, Seoul (KR)

( * ) Notice: Subject to any disclaimer, the term of this patent is extended or adjusted under 35 U.S.C. 154(b) by 774 days.

(21) Appl. No.: 10/312,110

(22) PCT Filed: Jun. 22, 2001

(86) PCT No.: PCT/KR01/01071

§ 371 (c)(1),
(2), (4) Date: Dec. 20, 2002

(87) PCT Pub. No.: WO01/99432

PCT Pub. Date: Dec. 27, 2001

(65) Prior Publication Data
US 2003/0091231 A1  May 15, 2003

(30) Foreign Application Priority Data
Jun. 23, 2000  (KR)  ............................... 2000-34760

(51) Int. Cl.
*G06K 9/00* (2006.01)
*G06K 9/36* (2006.01)

(52) U.S. Cl. ...................... 382/162; 382/164; 382/276

(58) Field of Classification Search ........ 382/162–167, 382/191, 276, 305; 358/518, 520, 539; 348/256
See application file for complete search history.

(56) References Cited

U.S. PATENT DOCUMENTS

| | | | |
|---|---|---|---|
| 4,870,480 A | 9/1989 | Chao | 348/727 |
| 5,350,650 A | 9/1994 | Gasper et al. | 430/21 |
| 5,473,736 A | 12/1995 | Young | 358/520 |
| 5,893,095 A * | 4/1999 | Jain et al. | 707/6 |
| 6,477,269 B1 * | 11/2002 | Brechner | 382/165 |
| 6,728,406 B1 * | 4/2004 | Murao | 382/165 |
| 6,754,667 B1 * | 6/2004 | Kim et al. | 707/102 |

* cited by examiner

*Primary Examiner*—Duy M. Dang
(74) *Attorney, Agent, or Firm*—Sheridan Ross P.C.

(57) ABSTRACT

The present invention relates to method for processing color image on image processing system. The method for processing color image on image processing system includes the steps of: extracting from the color image hue, luminance and saturation which are the factors of the color image; setting the saturation factor as predetermined constant by normalizing the saturation factor; transforming the color image into complex number using the hue factor and luminance factor. Accordingly, an image processing system can reduce the load of color image processing by way of present invention that reduces the redundancy between the factors of color images through transforming the three factors of the color image into complex number.

12 Claims, 2 Drawing Sheets

RGB COLOUR MODEL

HLS COLOUR MODEL (a)     (b)

COMPLEX VALUED COLOUR MODEL

RGB COLOUR MODEL

HLS COLOUR MODEL (a)

(b)

COMPLEX VALUED COLOUR MODEL

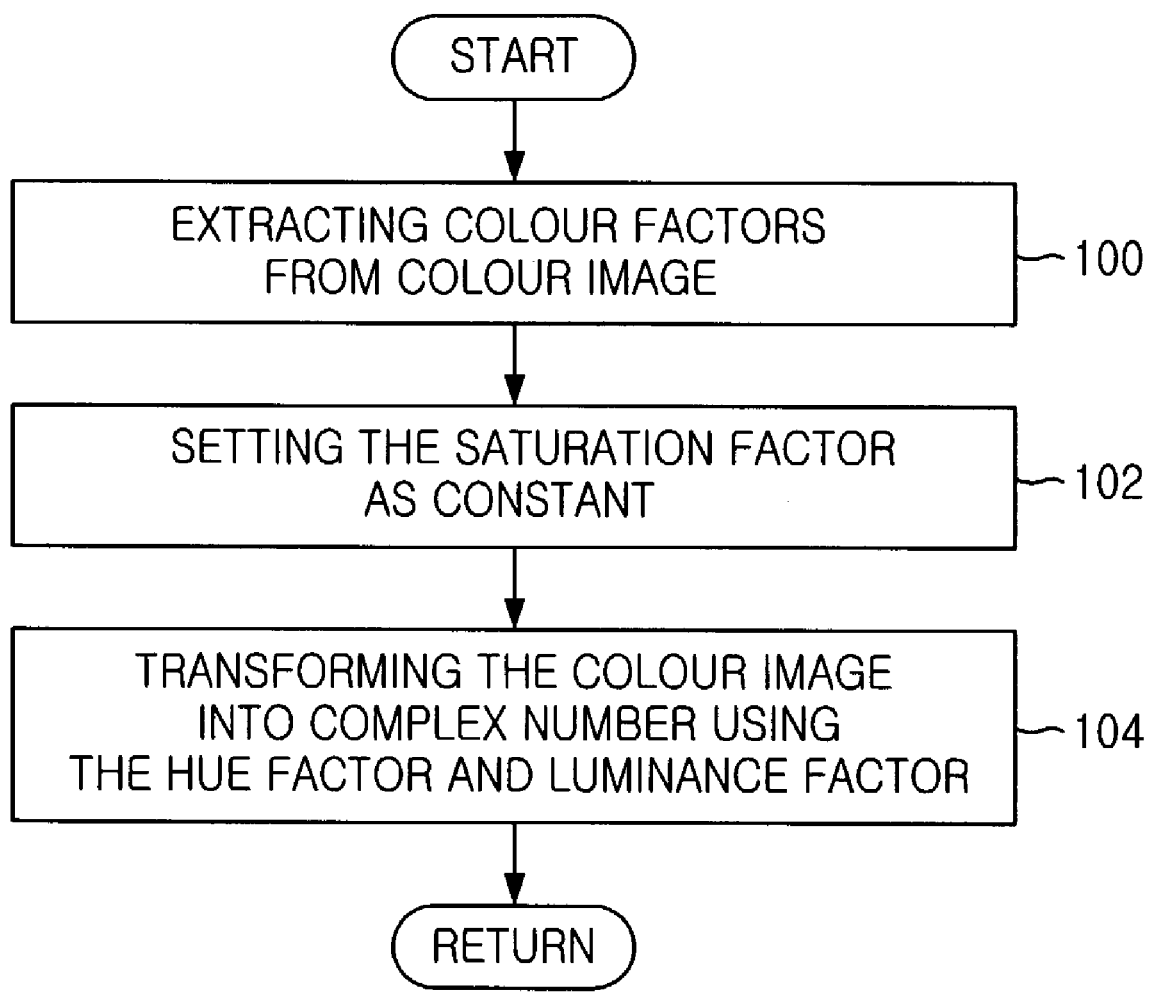

METHOD FOR TRANSFORMATING COLOR IMAGE ON IMAGE PROCESSING SYSTEM

TECHNICAL FIELD

The present invention relates to a method for processing colour image; and more particularly, to a colour image processing method on an image processing system that transforms factors of the colour image to complex number for image processing, and a computer-readable recording medium for recording a program that embodies the method.

BACKGROUND ART

Generally, a colour image is represented by the three (3) primary colours of light (Red, Green and Blue). But if you represent an image by the three (3) primary colours of light, you have the large amount of data on the image because each of the three (3) primary colours has strong correlation to the other and has redundant data.

So, there are a lot of conventional methods for representing colour images and one of the conventional methods is that representing colour images by luminance, hue and saturation that can reduce redundant data between the colour image factors. These values representing the colour image are being used in compressing, extracting the characteristic value of colour images, etc.

But, even though the conventional method is an efficient way of reducing the redundant data between the three (3) factors of colour image, it complicates mathematical computation and image process in compressing and extracting the characteristic value of colour image because it still uses the three (3) factors of colour image.

DISCLOSURE OF INVENTION

It is, therefore, an object of the present invention to provide a method for processing colour image, and a computer-readable recording medium for recording a program that embodies the method. The method transforms the colour image into hue, luminance and saturation that are the factors of the colour image. Because the saturation factor affects human visual sensation least, the method sets the saturation factor as predetermined constant, which reduces the factors of the colour image from three (3) to two (2). After that, the method transforms the colour image into complex number using the hue factor and luminance factor.

Accordingly, the present invention provides a method on an image processing system and a computer-readable recording medium for recording a program that embodies the method as though processing a colour image with only one (1) factor of the colour image.

Those who are skilled in the art of the present invention will easily recognize another purposes and advantages of this invention from the drawings, detailed description of the invention, and claims.

In accordance with one aspect of the present invention, there is provided a method for processing colour image on image processing system includes the steps of: a) extracting from the colour image hue, luminance and saturation which are the factors of the colour image; b) setting the saturation factor as predetermined constant by normalizing the saturation factor; and c) transforming the colour image into complex number using the hue factor and luminance factor.

In accordance with one aspect of the present invention, there is provided a computer-readable recording medium for recording a program for performing a method for processing colour image in an image processing system provided with a processor, the method comprising the steps of: a) extracting from the colour image hue, luminance and saturation which are the factors of the colour image; b) setting the saturation factor as predetermined constant by normalizing the saturation factor; and c) transforming the colour image into complex number using the hue factor and luminance factor.

The above and other objects and features of the present invention will become apparent from the following description of the preferred embodiments given in conjunction with the accompanying drawings. First, in giving reference number to the elements of the drawings, we tried to give the identical elements the same number as much as possible, although they are shown in different drawings. Also, when it is determined that too much detailed description on the related prior art may make the points of this invention blurry, that description is omitted. Referring to accompanying drawings, the preferred embodiments of the present invention will be described in detail, hereinafter.

BRIEF DESCRIPTION OF DRAWINGS

The above and other objects and features of the present invention will become apparent from the following description of the preferred embodiments given in conjunction with the accompanying drawings, in which:

FIG. 3 shows flow diagram illustrating the method of processing colour image on an image processing system in accordance with an embodiment of the present invention.

BEST MODE FOR CARRYING OUT THE INVENTION

Other objects and aspects of the invention will become apparent from the following description of the embodiments with reference to the accompanying drawings, which is set forth hereinafter.

Figure 1:
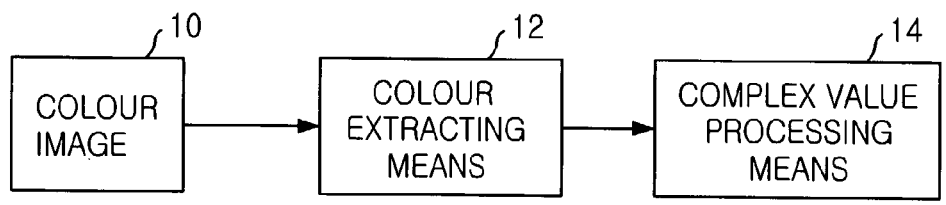
FIG. 1 is block diagram for describing an image processing system according to an embodiment of the present invention.

FIG. 1 is block diagram for describing an image processing system according to an embodiment of the present invention.

As shown in FIG. 1, a colour image processing system according to the present invention includes colour-extracting means 12 for extracting three (3) factors of hue, saturation and luminance from the colour image 10, and complex value processing means 14 for fixing the saturation factor as predetermined constant and for transforming the colour image 10 to complex number by the hue factor and luminance factor.

Figure 2:
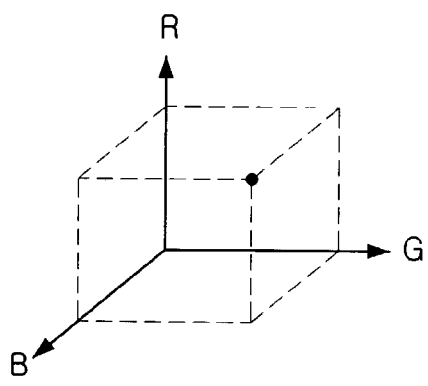
FIG. 2 is exemplary views of complex valued colour model according to the present invention.
Figure 2:
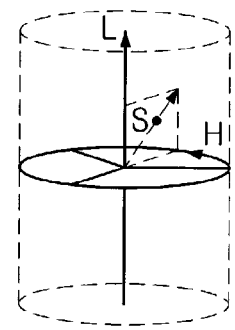
Figure 2:
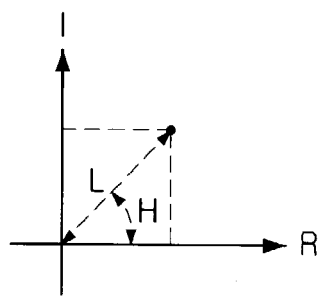
Figure 2:
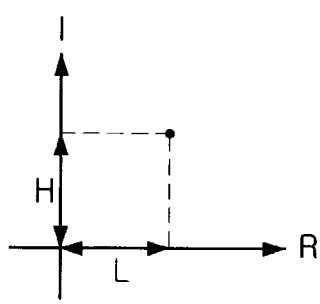

FIG. 2 is exemplary views of complex valued colour model according to the present invention.

As shown in FIG. 2, RGB (Red, Green, Blue) Colour Model and HLS (Hue, Luminance, Saturation) Colour Model are of three (3)-dimension. Complex Valued Colour Model are of two (2)-dimension of which X axis is imaginary part and Y axis is real part of complex number, the complex number representing the hue factor and luminance factor of the colour image.

Complex Valued Colour Model (a) of FIG. 2 is one having the hue factor (H) as phase part and luminance factor (L) as absolute value part of the complex value.

Complex Valued Colour Model (b) of FIG. 2 is one having the hue factor (H) as imaginary part and luminance factor (L) as real part of the complex value.

FIG. 3 shows flow diagram illustrating the method of processing colour image on an image processing system in accordance with an embodiment of the present invention.

As shown in FIG. 3, the method in accordance with the present invention transforms the colour image 10 into hue, luminance and saturation factors 100. After the method then sets the saturation factor as predetermined constant 102, the method transforms the colour image 10 into complex number using the hue factor and luminance factor 104, which results in construction of complex valued colour image.

There are various colour models including HSI (Hue, Saturation, Intensity), HSV (Hue, Saturation, Value), HLS (Hue, Luminance, Saturation), etc. that can be used in the step of transforming the colour image 10 into hue, luminance and saturation factors 100, and this step of transforming the colour image 10 using HLS (Hue, Luminance, Saturation) colour model is disclosed in this specification.

The HLS model transforms inputted image through the equations 1 below:

(Equations 1)

Luminance (L):

$$L = \frac{\max(r, g, b) + \min(r, g, b)}{2};$$

Saturation (S):

$$S = \frac{\max(r, g, b) - \min(r, g, b)}{\max(r, g, b) + \min(r, g, b)}, \quad \text{for } 0 < L \le 0.5$$

$$S = \frac{\max(r, g, b) - \min(r, g, b)}{2.0 - \max(r, g, b) - \min(r, g, b)}, \quad \text{for } 0.5 \le L < 1.0; \text{ and}$$

Hue (H):

$$H = \frac{60(g-b)}{\max(r, g, b) - \min(r, g, b)}, \quad \text{for } r = \max(r, g, b)$$

$$H = 120 + \frac{60(b-r)}{\max(r, g, b) - \min(r, g, b)}, \quad \text{for } g = \max(r, g, b)$$

$$H = 240 + \frac{60(r-g)}{\max(r, g, b) - \min(r, g, b)}, \quad \text{for } b = \max(r, g, b)$$

('r', 'g' and 'b' represent the colour of red, green and blue of the colour image respectively)

After transforming the colour image 10 into hue, luminance and saturation factors using the colour model 100, the step of normalising the saturation factor as predetermined constant between 0 and 1 is performed.

The saturation factor is utilised not in transforming original colour image to complex valued colour image, but in transforming complex valued colour image to original colour image.

It is desirable that the saturation factor should be set as the middle value in the normalised range (0 to 1).

Setting the saturation factor as the middle value in the normalised range can reduce query computation of the saturation factor in the process of transforming complex valued colour image to original colour image.

As the complex value processing means 14 transforms the inputted image to the complex valued colour image by the hue factor and luminance factor, the complex value is constructed with the luminance factor of the inputted image assigned to the absolute value part and the hue factor of the inputted image assigned to the phase part of the complex value respectively.

Transforming equation 1 (Equation 2) or Transforming equation 2(Equation 3) is utilised to transform the inputted colour image, already transformed to hue, saturation and luminance factor, into complex number:

$$CI = L \times e^{jH} = [\cos(H) + j\sin(H)] \quad \text{(Equation 2)}$$

('L' represents the luminance factor and 'H' represents the hue factor of the colour image)

$$CI = L + jH \quad \text{(Equation 3)}$$

('L' represents the luminance factor and 'H' represents the hue factor of the colour image)

The transforming equation 1 has the luminance factor of the colour image as the absolute value part and the hue factor of the colour image as phase part of the complex value.

The transforming equation 2 has the luminance factor of the colour image as real part and the hue factor of the colour image as imaginary part of the complex value.

From now on, a method for searching the colour image as one of fields where the complex valued colour image by the process described above can be utilised is disclosed.

First, the colour-extracting means 12 transforms inputted image to hue, luminance and saturation factors using the Equations 1, and normalise the saturation factor as the predetermined constant between 0 and 1.

The complex value processing means 14 then constructs complex valued colour image by transforming the inputted colour image to a complex number using the Equation 2 or Equation 3 with the hue factor and luminance factor.

After the construction of complex valued colour image, means for extracting characteristic value extracts the characteristic value from the complex valued colour image and database is set up with the characteristic value.

With the database, the inputted image similar to query image can be searched and outputted by constructing complex valued colour image of query image identical to the step of constructing complex valued colour image of inputted image, extracting the characteristic value from the complex valued colour image of query image in the means for extracting characteristic value, and comparing characteristic value of query image with characteristic value of inputted image stored in the database.

It is apparent that the colour image processing method according to the present invention can be used in various fields besides the field for searching the colour image.

Accordingly, an image processing system can reduce the amount of colour image process or computation by way of present invention that reduces the redundancy between the factors of colour images through transforming the three factors of the colour image into a complex number.

While the present invention has been described with respect to certain preferred embodiments, it will be apparent to those skilled in the art that various changes and modifications may be made without departing from the scope of the invention as defined in the following claims.

What is claimed is:

1. A method for processing colour image on image processing system includes the steps of:
   a) extracting from the colour image hue, luminance and saturation which are the factors of the colour images;
   b) setting the saturation9n factor as predetermined constant by normalizing the saturation factor; and
   c) transforming the colour image into complex number using the hue factor and luminance factor.

2. The method of claim 1 wherein the step a) extracts the factors at the colour image from the colour image using the equations below:
(Equations)
Luminance (L):

$$L = \frac{\max(r, g, b) + \min(r, g, b)}{2};$$

Saturation (S):

$$S = \frac{\max(r, g, b) - \min(r, g, b)}{\max(r, g, b) + \min(r, g, b)}, \quad \text{for } 0 < L \leq 0.5$$

$$S = \frac{\max(r, g, b) - \min(r, g, b)}{2.0 - \max(r, g, b) - \min(r, g, b)}, \quad \text{for } 0.5 \leq L < 1.0; \text{ and}$$

Hue (H):

$$H = \frac{60(g - b)}{\max(r, g, b) - \min(r, g, b)}, \quad \text{for } r = \max(r, g, b)$$

$$H = 120 + \frac{60(b - r)}{\max(r, g, b) - \min(r, g, b)}, \quad \text{for } g = \max(r, g, b)$$

$$H = 240 + \frac{60(r - g)}{\max(r, g, b) - \min(r, g, b)}, \quad \text{for } b = \max(r, g, b)$$

wherein the r, g and b represent the colour of red, green and blue of the colour image respectively.

3. The method of claim 1, wherein the step b) normalises the saturation factor as the predetermined constant between 0 and 1.

4. The method of claim 1, wherein the saturation factor is utilised not in transforming original colour image to complex valued colour image, but in transforming complex valued colour image to original colour image.

5. The method of claim 1, wherein the saturation factor is set as the middle value in the normalised range.

6. The method of claim 1, wherein the step b) transforms the colour image to complex valued colour image using the transforming equation 1 below:

$$CI = L \times e^{jH} = [\cos(H) + j\sin(H)] \quad \text{(Transforming equation 1)}$$

WHEREIN the L represents the luminance factor and the H represents the hue factor of the colour image.

7. The method of claim 6, wherein the transforming equation 1 has the luminance factor of the colour image as the absolute value part of the complex value.

8. The method of claim 6, wherein the transforming equation 1 has the hue factor of the colour image as phase part of the complex value.

9. The method of claim 1, wherein the step b) transforms the colour image to complex valued colour image using the transforming equation 2 below:

$$CI = L + jH \quad \text{(Transforming equation 2)}$$

WHEREIN the L represents the luminance factor and the H represents the hue factor of the colour image.

10. The method of claim 9, wherein the transforming equation 2 has the luminance factor of the colour image as real part of the complex value.

11. The method of claim 9, wherein the transforming equation 2 has the hue factor of the colour image as imaginary part of the complex value.

12. A computer-readable recording medium for recording a program for performing a method for processing colour image in an image processing system provided with a processor, the method comprising the steps of:
   a) extracting from the colour image hue, luminance and saturation which are the factors of the colour image;
   b) setting the saturation factor as predetermined constant by normalizing the saturation factor; and
   c) transforming the colour image into complex number using the hue factor and luminance factor.

* * * * *